United States Patent [19]
Johnson

[11] Patent Number: 5,232,953
[45] Date of Patent: Aug. 3, 1993

[54] METHOD AND APPARATUS FOR WASTE BRINE MANAGEMENT IN WATER CONDITIONERS

[76] Inventor: Randy W. Johnson, 14476 Iroquois Rd., Apple Valley, Calif. 92307

[21] Appl. No.: 874,749

[22] Filed: Apr. 27, 1992

[51] Int. Cl.$^5$ ............................................. B01J 49/00
[52] U.S. Cl. ..................... 521/26; 210/660; 210/661; 210/670; 210/675; 210/676; 210/677; 210/678
[58] Field of Search ................. 521/26; 210/688, 670, 210/676

[56] References Cited

U.S. PATENT DOCUMENTS

| | | | |
|---|---|---|---|
| 3,977,968 | 8/1976 | Odland | 521/26 |
| 3,985,648 | 10/1976 | Casolo | 210/686 |
| 4,207,397 | 6/1980 | Davis | 521/26 |
| 4,492,083 | 1/1985 | McCabe | 166/371 |

OTHER PUBLICATIONS

Sales Booklet, Autotrol Corporation, Milwaukee, Wis., 1989; 6 pp.
Model 2850 Manual, Fleck Controls, Inc., Brookfield, Wis., pp. 3-6 and 23-24.

Primary Examiner—Joseph L. Schofer
Assistant Examiner—Fred Zitomer
Attorney, Agent, or Firm—Christie, Parker & Hale

[57] ABSTRACT

A water softening device is provided with a waste storage tank for receiving waste liquid, such as hard water used to draw out brine from a brine storage tank, as well as the used brine itself during a regeneration cycle. The tank outlet communicates with a sprinkler system, and when the sprinkler system is on, an injector valve sucks waste liquid from the waste tank to mix it in with the sprinkler system water and thereby further dilute the liquid. A method of processing the waste water accordingly includes collecting this waste liquid and preferably mixing it in with the sprinkler fluid. The brine waste and brine supply tanks in one embodiment are preferably formed as one unit with two separate compartments. The inlet pipe to the brine waste compartment has an overflow safety valve which senses, through a float mechanism, when the tank is substantially full. The valve has a normally closed port connected to a leach line or the like. This normally closed port opens when the substantially full condition is sensed, while the normally open port leading to the interior of the tank closes, so that incoming waste water passes through the valve to the leach line without changing the water level in the tank.

5 Claims, 3 Drawing Sheets

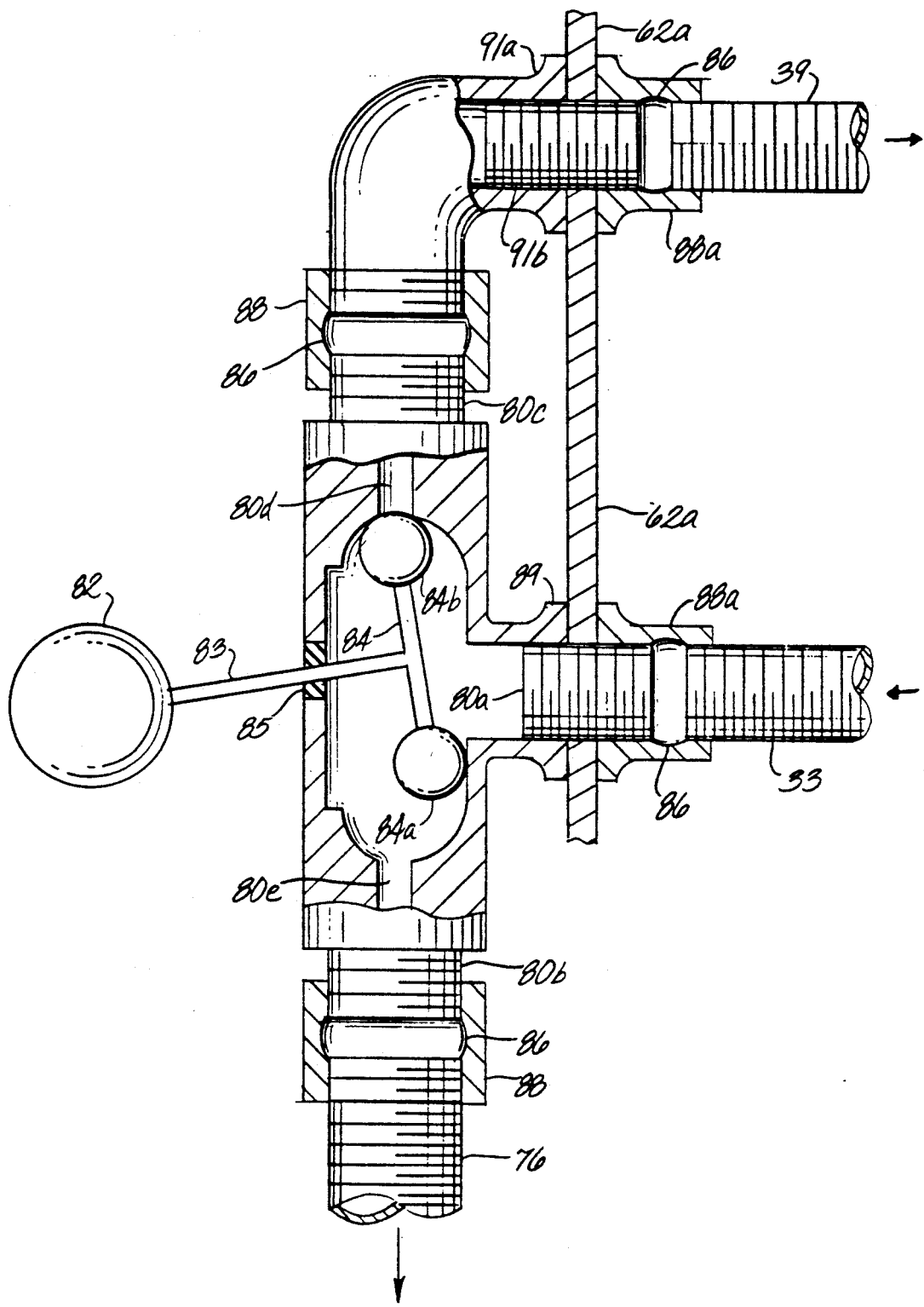

METHOD AND APPARATUS FOR WASTE BRINE MANAGEMENT IN WATER CONDITIONERS

BACKGROUND OF THE INVENTION

The present invention relates to water softening systems and, more particularly, to an apparatus for, and a method of, reducing total dissolved solids (TDS) in the discharge from the softening system.

Hard water, i.e., water containing certain minerals, such as calcium and magnesium, is undesirable in that these minerals will form a curd when they come in contact with soap, and they will scale in piping, water heaters, pots, washing machines, etc. To alleviate this problem, water softening systems have become quite popular. Such systems convert hard water to soft water by removing minerals, mainly magnesium and calcium, from the hard water. This is done by a process known as positive ion exchange. In this process, sodium or other ions are substituted for calcium and magnesium ions in the hard water.

The process basically involves running hard water through an exchange media, such as polystyrene beads or e.g., zeolite "charged" with positive ions, such as sodium ions or potassium ions. These ions are attracted to the beads due to an inherent negative charge in the beads. A brine, consisting of sodium chloride or potassium chloride dissolved in water, is run over the beads to perform charging. Once the beads are charged, the system is ready to operate by running hard water through the beads. Positive ion exchange thus takes place, and the effluent water is soft.

Eventually, the sodium or potassium ions carried by the beads will be depleted, or virtually depleted. The beads will then need to be recharged with sodium or potassium. The recharging process is the same as the initial charging process in that brine passes over the beads. However, in recharging, any effluent brine now contains magnesium, calcium, and sodium chloride or potassium chloride, as is well known in the art. This recharging process is commonly referred to as regeneration.

The effluent liquid from the regeneration process will have a high degree of what is known as total dissolved solids (TDS), i.e., on the order of 25,000 ppm for an NaCl brine and 22,000 ppm for a KCl brine, much of which will be chlorides. Other elements, such as manganese, iron, sodium, magnesium, and potassium, either naturally existing in the water or collected as a result of water softening, contribute to the TDS of the effluent waste water, as well as chlorides, and thus are present in the 22,000 to 25,000 TDS water.

This high TDS effluent previously has been sent through a drain to the sewer system as any drain water from a house, office, etc. Due to recent environmental concerns and the desire for water reclamation, many municipalities are enacting or considering ordinances limiting the amount of chlorides and/or TDS that can be sent through sewer systems. These limits often are on the order of 250 ppm chlorides and 500 ppm TDS. Since effluent in the regeneration process far exceeds this typical maximum acceptable amount, water softeners have often been flat out banned by some municipalities.

Even if such softeners are not banned, costly service is required to meet the minimum ppm requirements. Such service typically involves service personnel periodically traveling to the houses or offices having water softeners, removing the tanks with the used beads, and replacing them with tanks of charged beads. The tanks with the used beads are taken to a facility for a centralized regeneration process. Once regenerated, these tanks of beads can again be used to replace other tanks with used beads.

Therefore, there is a great need for a water conditioning system that meets TDS requirements.

SUMMARY OF THE INVENTION

In a water softening system, there is a multi-port valve that connects a hard water inlet pipe with a resin tank containing water-softening media, a conditioned water outlet pipe, a drain line, and a brine supply tank. According to an embodiment of the invention, the drain line is connected to a brine waste tank. Waste liquid from the water conditioning system, including hard water used to draw brine from the supply tank and the brine, is sent through the drain line to the brine waste tank, instead of to the household drain. Thus, the hard water used to draw the brine, and any additional drain liquid captured, as desired, such as from backwashing and rinsing cycles, can dilute the brine waste to an acceptable, or at least much lower, TDS level.

In a preferred embodiment, the brine waste, now mixed with hard water, is diluted even further. The brine waste tank connects to a waste discharge line leading to an existing irrigation system, such as a sprinkler system. The irrigation system has a main flow containing a low TDS fluid which is sent out to the surrounding landscape. The normal irrigation water supply pipe is provided with a venturi-type valve, or the equivalent, to draw the brine waste through a suction port of the valve. This mixes the diluted brine waste with the sprinkler water in a ratio sufficient to achieve the desired maximum TDS level or lower.

In a particularly preferred embodiment, the inlet pipe to the brine waste tank has an overflow safety valve which senses, through a float mechanism, when the tank is substantially full. The valve also has a normally closed port connected to a leach line or the like. This normally closed port opens when the substantially full condition is sensed, and the waste from the drain line entering the valve goes directly to the leach line without entering the tank. In addition, the brine waste and brine supply tanks are preferably formed as one tank with two separate sides.

BRIEF DESCRIPTION OF THE DRAWINGS

FIG. 3 is an enlarged partial sectional view of an overflow safety valve for use in the brine waste storage tank according to the invention.

DETAILED DESCRIPTION OF THE PREFERRED EMBODIMENT

Figure 1:
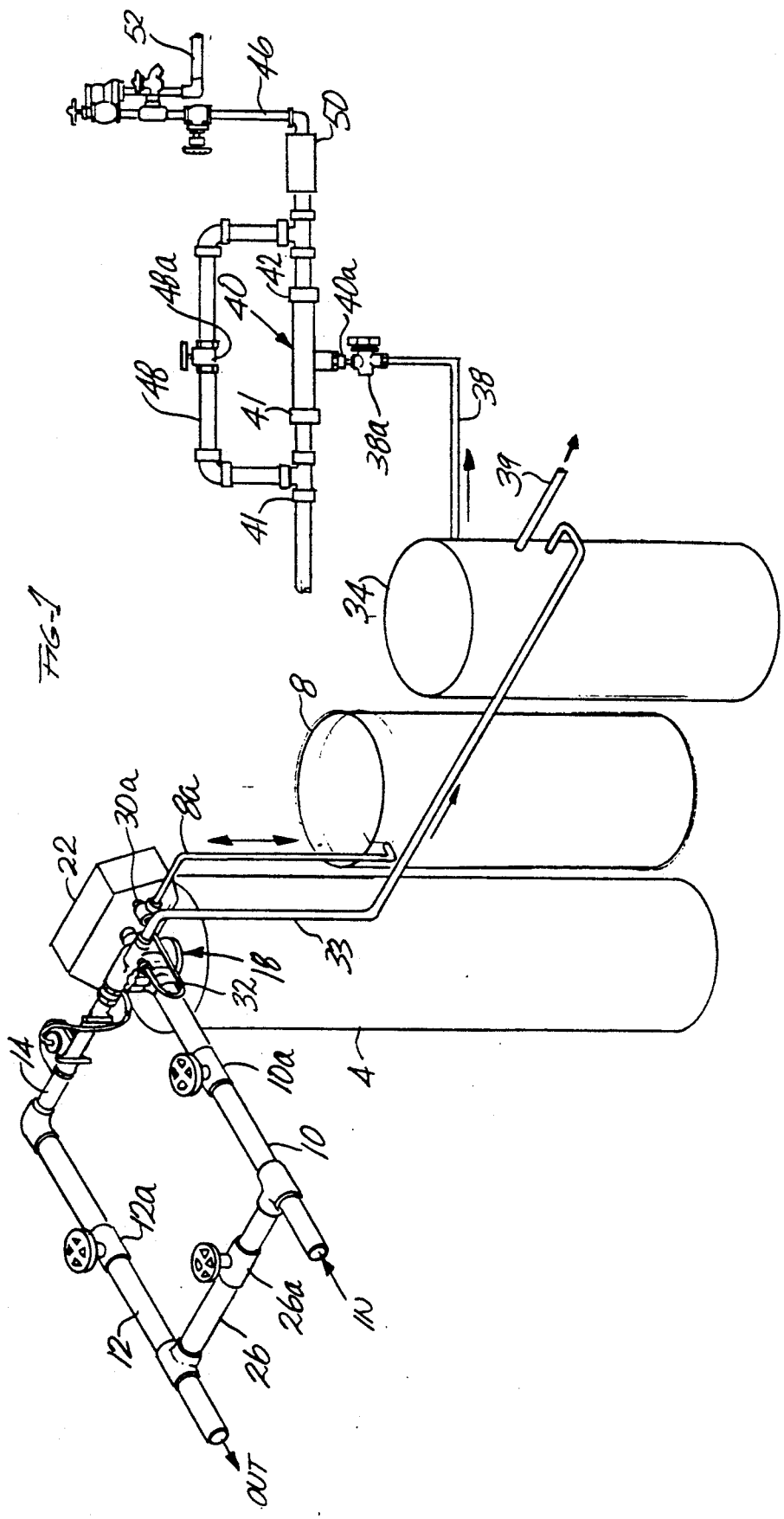
FIG. 1 is a schematic view of a water conditioning system according to the invention, including a brine waste storage tank connected to the drain line of the water softener multi-port valve, and also connected to an irrigation system.

FIG. 1 shows a water softener system modified in accordance with the invention and further connected to a sprinkler system.

The softener system has a resin tank 4 containing a softening media, such as a polystyrene resin bed, in the form of beads. A brine supply tank 8 contains brine formed by water with salt, such as sodium chloride, or, preferably, potassium chloride. Hard water which is to be softened by the system enters inflow pipe 10, and softened water exits the system by outflow pipes 12, 14. The inflow and outflow pipes each connect to a standard multi-port valve 18, which is controlled by a conditioning control unit 22, as is well known in the art. Pipes 10, 12 have manual shutoff valves 10a, 12a. There is a conditioning system bypass line 26 and valve 26a.

Resin tank 4 directly connects to two ports of valve 18, which is mounted on top of the resin tank. Brine tank 8 connects to valve 18 by a pipeline 8a, a brine flow valve 30 also controlled by unit 22, and a flexible hose 32. The multi-port valve 18 also connects with a drain line 33.

So far, the structure of the conditioning system and its operation is well known. Briefly, in operation, the water conditioner has several cycles: a service cycle in which water is conditioned, a backwash cycle to clean sediment from the resin bed just prior to regeneration, a regeneration cycle, a rinse cycle or cycles to wash brine from the resin bed, and a brine tank refill cycle. To effect each cycle, controller 22 controls the multiport valve 18 and flow valve 30. One example of a suitable conditioner uses a Model 2850 multi-port valve and flow valve made by Fleck Controls, Inc., Brookfield, Wis.

In the service position, hard water enters the multi-port valve inlet and flows down through the valve into the resin tank and through the polystyrene resin media. The conditioned water enters a center tube through a distributor located proximate the bottom of the tank, then flows up through the center tube, around a piston of the multi-port valve, and out the main outlet of the valve to the soft water outlet pipes 12, 14.

In the backwash position, hard water enters the multi-port valve at the valve inlet, flows through the piston, down the center tube in the resin tank, through the bottom distributor, and up through the beads. Then, the water flows around the piston and out the drain line 33. For the service and backwash cycles, the brine flow valve is closed.

In the regeneration cycle, the brine flow valve 30 is open to allow flow from the brine supply tank 8 to brine line 8a, valve 30, and hose 32. However, the brine must be drawn out of the brine supply tank by flowing hard water through the inlet of the multi-port valve 18, up into an injector housing of the valve, and down through a nozzle and throat of the valve to draw brine from the brine tank. The brine then flows into the multi-port valve, down through the beads to perform regeneration, and enters the center tube through the bottom distributor. The brine then re-enters the multi-port valve 18 and passes to the drain line 33.

In the rinse cycle or cycles, the beads are rinsed by hard water to remove excess brine. The Model 2850 conditioner has two rinse cycles, including a first slow rinse and a second rapid rinse. In the slow rinse, hard water enters valve 18 at its inlet, flows up into the injector housing and down through the nozzle and throat, around the piston, and into the resin tank. The hard water flows down through the polystyrene beads, enters the center tube through the bottom distributor, and flows up through the tube back into the valve. The water flows around the piston and out to the drain line 33.

In the rapid rinse cycle, hard water enters the valve inlet, flows directly from the inlet down through the beads, and into the center tube via the bottom distributor. The water passes up through the center tube, into the valve, around the piston, and out through drain line 33.

In the brine tank refill cycle, the brine flow valve 30 is open. Hard water enters the multi-port valve 18 at its inlet, flows up through the injector housing, through the brine valve, and down through brine line 8a to the brine supply tank 8. This refills the tank with water in which the salt, such as potassium chloride, which is normally lying on the bottom of the brine tank or on a brine shelf, dissolves into until the saturation point.

During all cycles, except regeneration and brine tank refill, the brine flow valve is closed.

In accordance with the invention, there is a brine waste tank 34. Drain line 33 connects to this brine waste tank, rather than passing directly to a household drain. Thus, instead of draining to a sewer system or the like, as in the prior art, drain fluids pass via the drain line 33 to the brine waste tank 34. Preferably, all fluid which is sent to the drain line during any cycle of the conditioner drains into the waste tank, including hard water used during the backwash cycle, hard water used for drawing brine from the brine storage tank during the regeneration cycle, brine from the regeneration cycle, and hard water from the rinse cycle or cycles.

The brine which is sent to the waste tank 34 is high in TDS. Generally, it is the chlorides contained in the brine waste which account for a portion of the high TDS that are of major concern. Sodium would also be of concern where sodium chloride is used. Capturing all of the waste water that passes through drain line 33 serves to dilute the high TDS brine waste, as all of the other water going to the drain line has relatively low or negligible amounts of TDS. The high TDS fluid is all that needs to be captured in the waste tank, because this is all that generally exceeds the TDS requirements, such as a TDS of 500 ppm (with 250 ppm of chlorides). However, it is preferred to capture all drain fluids, as the other fluids will help dilute the high TDS fluid. The ratio of drain fluid which is low or negligible in TDS versus the high TDS fluid depends on the system requirements, such as the amounts of water (Wd) needed to draw brine, brine (Wc) needed to perform regeneration, and the water (Wb and Wr) needed for backwashing and rinsing. The amount of dilution may be calculated, where the total captured drain waste water is Ww, as shown below:

$$Ww = Wc + Wd + Wb + Wr \tag{1}$$

$$\text{Define, } D = Wd + Wb + Wr \tag{2}$$

$$\text{Then, } Ww = Wc + D \tag{3}$$

If the TDS, measured in ppm, of the high TDS fluid (Ww) is represented by Cw, and if the TDS of the other fluids is represented by Cd, then the TDS of the mixture, represented by Cr, is given by the following equation:

$$Cr = (Cw \times Wc + Cd \times D)/Ww \tag{4}$$

If Cd is negligible, then:

$$Cr = Cw \times Wc/Ww \qquad (5)$$

For example, a typical system has 1 cubic foot of resin, which requires about 1.5 to 2.5 gallons of brine having approximately 8 lbs. of KCl brine for regeneration. Taking an average of 2.0 gallons of waste brine and 20 gallons of hard water to draw the brine out, and backwash and rinse, and, even assuming Wr and Wb are negligible, Ww equals 22 gallons. Therefore, Cr equals $(2/22) \times Cw$. Typically, Cw is about 11,000 ppm chlorides, so Cr would be 1000 ppm.

To reach a 250 ppm chloride requirement, the liquid now in the brine waste tank having 1000 ppm must be further diluted by a factor of four. This further dilution is achieved, in the exemplary embodiment, by mixing the liquid in the tank with another stream of low or negligible TDS water. Preferably, this stream is provided by water used in an irrigation or sprinkler system.

With continued reference to FIG. 1, a pipeline 38 leads from the waste tank 34 through a metering valve 38a to a mixing device, such as an injector valve 40, disposed along a sprinkler system main flow pipeline 44. This injector valve 40 mixes the contents of the waste tank 34 with the main water flow of the sprinkler system in a desired ratio to achieve the desired final TDS content. In the example given above, the ratio would have to be at least three parts of the main flow for one part of brine waste tank contents. Although the injector valve can be dedicated, i.e., fixed at this ratio, it is preferred that the device be adjustable. Such a device preferably is a venturi-type injector, a hydraulically operated proportional feed pump, or any type of electrical metered injection pump. The feed pump or injection pump is preferred where the distance from waste tank 34 to valve 40 is too great when compared with the suction force in a venturi-type valve.

The ability to adjust the injection device ratio is commercially important since all applications in which the injector device is to be used could vary as to flow rates, gallons used per day for irrigation, and gallons used for regeneration. A suitable injector valve is manufactured by Mazzei Injector Corporation of Bakersfield, Calif. Such valves automatically mix flow from their suction port 45 into the main flow from its inlet 41 to its outlet 42. The injector valve 40 thus achieves an appropriate pressure differential between its inlet 41 and outlet 42 to create a partial vacuum at the suction port to draw the waste liquid into the main flow in the desired proportion. A check valve 40a is located between the meter 38a and injector suction port 45. A bypass line 48 with a valve 48a is also preferably provided.

After the sprinkler main flow sucks the waste liquid into it and passes through the injector valve outlet 42, a scaling reduction device 50 is provided. Such a device may be catalytic, magnetic, or electromagnetic, and its structure would be well known to one of ordinary skill in the art. The device would reduce scaling of the irrigation lines, sprinkler heads, and other devices downstream of the device, which could otherwise be caused by the higher levels of calcium, magnesium, or potassium now contained in the liquid flow to the sprinkler heads.

The mixed flow which passes through the scaling reduction device 50, then continues through existing sprinkler pipes 51 and 52 and exits through the sprinkler heads to the landscape.

To understand that the water flow of the sprinkler system will be sufficient to dilute the waste liquid in tank 34, it is useful to consider typical household water requirements. In an average family of four, regeneration would occur every three days (as shown later), thus putting about 22 gallons of 1000 ppm chlorides liquid into the brine waste tank every three days. The amount of water in the sprinkler system necessary to dilute the 22 gallons is at least 66 gallons in three days. A typical sprinkler system will use far more than 66 gallons of sprinkler water in three days. Calculation of these typical numbers is explained below.

The capacity of a water conditioning unit is based on the quantity of resin beads measured in cubic feet, the type of resin, and the amount of brine used for regeneration. As noted above, a typical water softener would use a 1-cubic-foot resin bed. A typical resin would have a maximum capacity of removing 32,000 grains of hardness. (Hardness is measured in grains per gallon, although it may also be measured in milligrams per liter or parts per million. One grain per gallon equals 17.1 ppm, or milligrams per liter.

Generally, full regeneration of such a resin bed, i.e., regeneration sufficient to reach the 32,000 grains of hardness capacity of the resin, takes brine having approximately 20 lbs. of salt dissolved less salt, the hardness removal capacity which can be achieved by regeneration is decreased, but the decrease is not linear. For example, 15 lbs. of salt achieves a 30,000-grain removal capacity, and only 8 lbs. of salt achieves a 24,000-grain removal capacity.

In California, 8 lbs. of salt per cubic foot of resin is mandated as a maximum amount of salt. Consideration of reduction to 6 lbs. per cubic ft. is underway, but if the amount of salt which is in the brine used for a regeneration cycle is reduced too far, regeneration would have to take place too often and thereby use an excessive amount of water. This, of course, would be wasteful if water is in short supply.

The importance of the amount of salt used in the brine for a regeneration cycle is significant in that it is important in determining how much landscape or irrigation water is needed for proper dilution of the waste liquid in the brine waste tank. To determine how much brine solution would need to be handled by the landscape irrigation system, the hardness of the water and the water usage of the household must be known. These are readily determined, as is well known in the art.

With the system capacity (S.C.) in grains, taken as 24,000, and a water hardness (W.H.) of 24 grains per gallon, and taking water usage (W.U.) as equal to an industry standard of 75 gallons per day per person for four people, the number of days until regeneration (D.U.R.) is determined by the following equation:

$$D.U.R. = S.C./(W.H. \times W.U.) \qquad (6)$$

Therefore, $$D.U.R. = 24,000/(24 \times 4 \times 75) \qquad (7)$$

Thus, D.U.R. is 3⅓ days. If, to be safe, regeneration occurs every 3 days, there is about 22 gallons of 1000 ppm chloride waste to remove every 3 days. The 75-gallon usage can readily be reduced to 50 gallons per day in actuality with average water conservation techniques, e.g., low-flow fixtures, to reduce the frequency of regeneration.

Past water softening systems have initiated the regeneration cycle after a set period, such as 3 days. Thus, the present invention is suitable for this time clock-type regeneration approach. It is noted that newer systems use a "demand initiated regeneration" approach, where the amount of hard water which is softened is metered, and after a certain amount (e.g., 900 gallons in the above example, which equals 300 gallons per day for 3 days) of hard water is softened. The invention works with either the timer or the demand approach. Since the demand approach is usually more efficient, it is preferred.

For the above example of reduction of chloride concentration by a factor of ten in the waste tank, and a further reduction by a factor of four in the irrigation system to reach 250 ppm chlorides, this would usually reduce TDS (all dissolved solids) to about 550. If there is a TDS maximum legal amount in effect, and the 550 TDS meets it, the factor-of-four further reduction is sufficient. If not, more irrigation water must be used per gallon of waste tank liquid to meet the TDS requirements, even though the total chlorides requirement may be met.

Figure 2:
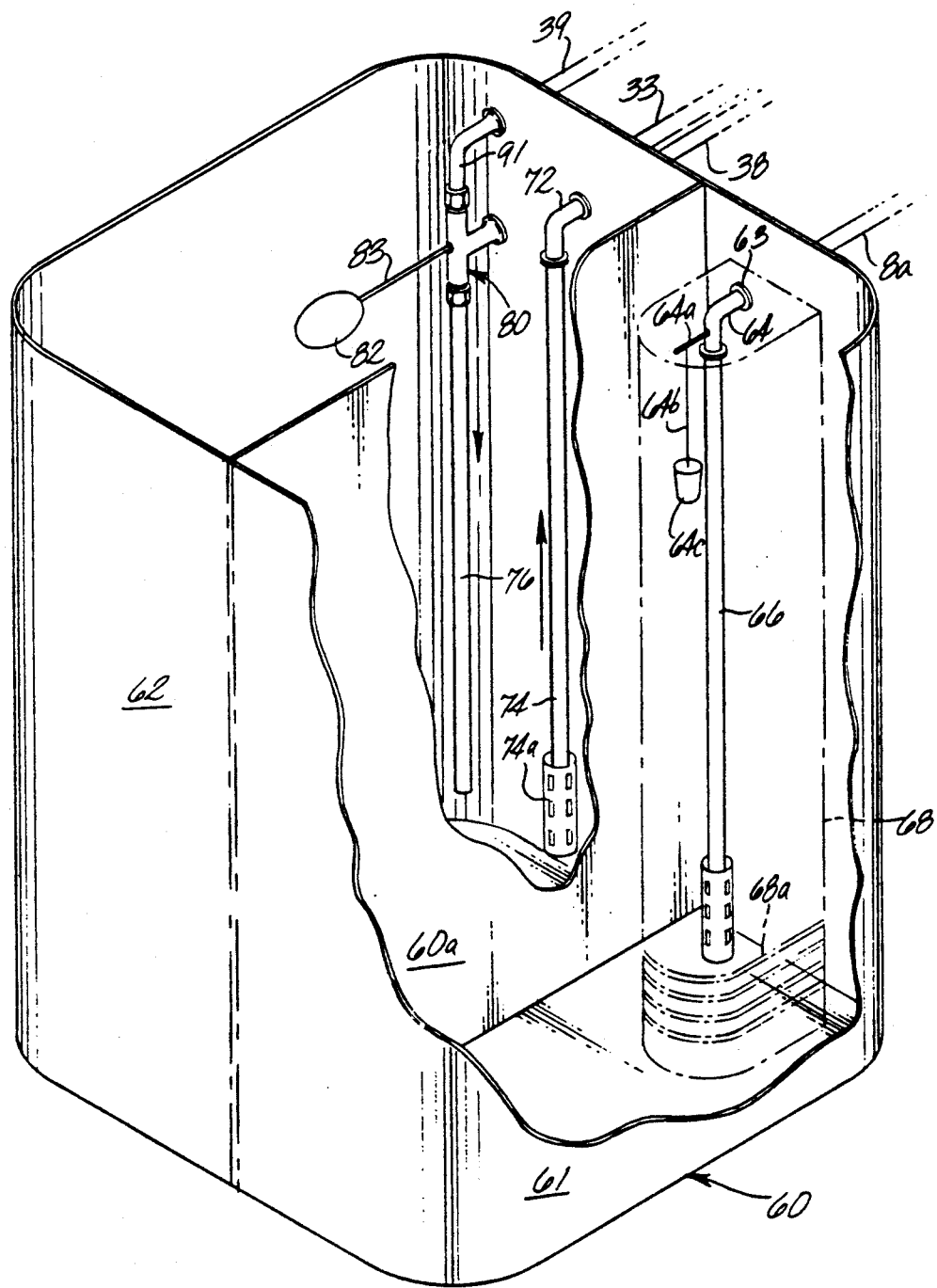
FIG. 2 is a schematic view of a dual compartment softener tank according to a second embodiment of the invention.

FIG. 2 shows the brine supply tank and brine waste tank converted into one dual unit 60. Operation and internal structure of the separate tanks 8, 34 of FIG. 1 is the same as that of the single tank of FIG. 2, so such structure and operation is only explained here with reference to FIG. 2.

The dual unit has a brine source tank side 61 and a brine waste tank side 62 defined by a dividing wall 60a. Supply side 61 functions the same as is well known in the art. It has inlet/outlet 63 communicating with brine line 8a of FIG. 1. Inlet/outlet 63 is defined by an elbow connected to a vertical inlet/outlet pipe 66. The elbow 64 preferably has an overflow valve installed therein. This overflow valve is triggered by a link arm 64a connected to another arm 64b which supports a float 64c. Through the link arms, the weight of the float 64c normally pulls a valve member in the elbow into an open position so that inlet/outlet port 63 is open. However, if the brine level in supply side 61 gets too high, the float moves upward sufficiently to cause link arm 64a to move the valve member to close inlet/outlet port 63. Elbow 64, the float mechanism, and vertical pipe 66 are in a brine well 68, formed by a barrier member, which serves to keep the salt (e.g., potassium chloride) supply away from an air check valve 66a at the bottom opening of pipe 66. The check valve serves to close the pipe 66 before brine flows completely out of the tank so that air does not enter the pipe 66. The bottom of the brine well 68 has openings 68a to let brine or water pass therethrough, yet keep the salt away from air check valve 66a.

Waste storage side 62 has an outlet port 71 which communicates with line 38 to the sprinkler system. This outlet is formed by an elbow 72, similar to elbow 64, but without the overflow valve mechanism. Elbow 72 connects to a vertical outlet pipe 74, also having an air check valve 74a at its lower end. If desired, a brine well can be used around pipe 74 and the check valve.

A vertical inlet pipe 76 connects to a dual-direction safety valve 80 in accordance with the invention. Valve 80 has an inlet 80a from drain pipe 33 of FIG. 1. Valve 80 also has a first outlet 80b which leads to inlet pipe 76.

Referring to FIG. 3, in addition to FIG. 2, there is shown details of the safety valve 80. Valve 80 is actuated, as described below, by a float 82 and a link arm 83 which is unitary, or integrally connected, with a valve member 84. Valve member 84 has lower and upper balls 84a, 84b. FIG. 3 shows the valve member 84 with the upper ball 84b in its normal seated position.

The valve 80 has an inlet 80a, a first outlet 80b, and a second outlet 80c. Inlet pipe 76 connects to a threaded member forming first outlet 80b. This connection is preferably formed using a ferrule 86 or clamping ring fixed by a compression nut 88. The inlet 80a is connected to the drain line 33 by an extending threaded portion 89a from a flange 89 of valve 80. Pipe 33 and threaded section 89a are joined by another ferrule 86 and a compression nut 88a, which has a flange. These two flanges press against back wall 62a of the waste storage side 62.

The second outlet 80c is formed by a threaded member which is connected to an elbow 91 using a further ferrule 86 and another compression nut 88 in the same way as first outlet 80b is formed and connected to pipe 76. The elbow 91 further communicates with a leach line 39. The elbow has a flange 91a and a threaded extension 91b, the same as inlet 80a. Another ferrule 86 and another compression nut 88a having a flange is provided. The flange 91a and flange of nut 88a press against wall 62a the same as at the inlet 80a of the valve. While normally it might be preferred to have the compression nuts inside tank 60, so that if leakage occurs it falls in the tank, to obtain a more rigid connection of the valve to wall 62a, the threaded sections of elbow 91 and inlet 80a are extended, as necessary, to pass through the back wall. Appropriate measures, such as applying tape, can be used to guard against leakage.

In operation, the diluted brine waste in waste storage side 62, when drawn by the venturi action, or pumping, of injector device 40, will pass through outlet pipe 74. The brine waste and other waste water will enter side 62 from drain line 33. It will pass through valve inlet 80a and down through first outlet 80b. Second outlet 80c will be closed. Normally, the weight of float 82 is such that it is in a downward position, as shown in FIG. 3, upper ball 84b seats at, and blocks, opening 80d of second outlet 80c. This leaves opening 80e of first outlet 80b open.

When cycles occur which add liquid to waste side 62 through drain pipe 33, if too much liquid is entering, float 82 will be pushed upward with respect to the position of FIG. 3 such that upper ball 84b unseats from opening 80d, leaving the second outlet 80c open. Lower ball 84a will seat in opening 80e and block the first outlet 80b. The waste water will pass into the valve cavity and out the second outlet 80c to a leach line or the like to prevent overflow.

Waste storage side 62 is preferably sufficiently large to avoid the necessity of passing liquid through the leach line; however, even if some liquid must pass, since most, if not all, is diluted by about a factor of 10, as discussed above, compared with the high TDS brine waste, the occasional dispersal of 1000 ppm chloride liquid should not be harmful (providing potassium chloride is used instead of sodium chloride). If ordinances do not prevent connection of the second outlet of valve 80 to the household drain, then this can be done. However, connection to the leach line or a soaker hose, which lead to the landscape, are preferably used. The liquid can be thus sent to the landscape. Periodic concentrations of approximately 1000 ppm chlorides should not be detrimental, as it will be small in amount and will typically be further diluted by rain or landscape/irrigation water which has been delivered by sprinklers or other methods.

It should be noted that the waste side 62 and supply side 61 preferably have openable lids (not shown in FIG. 2). In addition, while both the supply and waste sides 61, 62 can be provided with an overflow fitting, as is well known in the art, such a fitting does not normally remove liquid under pressure, so if liquid is entering the tank under pressure, it may still overflow. Therefore, safety valves are preferred.

The benefits of the above-described system include:

Soft water achieved with zero or substantially zero waste liquid, as the liquid collected in the waste side or waste tank will be used in landscaping or the like.

The use of potassium chloride, which is a "by-product" of the ion exchange process, is beneficial to soil in that it is a nutrient. Sodium chloride can be used, but potassium chloride is preferred.

Water softeners can now be used in areas where brine discharge is prohibited. In fact, in many such areas where it is prohibited, or in the process of being prohibited, the invention will avoid the necessity for the debate and/or litigation or the like between municipalities, environmentalists, and water softener companies. Substantial savings in time and resources are thus achieved for the consumer, as well as the municipality and water softener companies.

The system, in its preferred embodiments, is readily adaptable to existing water softening units and to existing sprinkler systems, and new systems containing a dual tank or the like do not require substantial retooling or other measures.

Sodium intake for the users of softened water is reduced, while potassium intake is increased when potassium chloride is used as the salt.

The system eliminates harmful discharge and makes use of the waste liquid and thus would meet environmental and conservation concerns.

It should be noted that the diluted brine in the waste tank could be sent directly to the household drain, if 1000 ppm chlorides and 2200 TDS or the like is sufficiently low to meet any environmental ordinances in effect. In that case, pipe 38 of FIG. 1 leading to the injector valve of the sprinkler system could simply be directly connected to the household drain.

Many variations of the invention will be evident to those of ordinary skill in the art. The appended claims are directed to the invention, and are thus not limited to the disclosed embodiments.

What is claimed is:

1. A method of regenerating a water softening medium using brine for a home water softening unit and processing effluent waste water from said regenerating, the regenerating and processing method comprising the steps of:

drawing brine from a source of brine by passing raw water through the water softening medium to a waste line;

flowing the brine through the water softening medium to regenerate the medium and thereafter passing the brine to the waste line, the brine having a relatively high amount of total dissolved solids;

collecting the raw water from the waste line during the step of drawing;

collecting the brine from the waste line during the step of flowing and mixing it with the collected raw water to create a diluted liquid brine mixture;

mixing the diluted liquid brine mixture with additional raw water from a household land watering system to create a further diluted liquid brine mixture having a relatively low amount of total dissolved solids; and watering the land with the further diluted liquid brine mixture.

2. The method of claim 1, wherein the brine comprises water and potassium chloride.

3. A method of regenerating a water softening medium using brine for a home water softening unit and processing effluent waste water from said regenerating so that total dissolved solids are below a predetermined amount set by environmental regulation, the regenerating and processing method comprising the steps of:

drawing brine from a source of brine by passing raw water through the water softening medium to a waste line, the brine having an amount of total dissolved solids above the predetermined amount;

flowing the brine through the water softening medium to regenerate the medium and thereafter passing the brine to the waste line;

collecting the raw water from the waste line in the tank during the step of drawing;

collecting the brine from the waste line in the tank during the step of flowing and mixing it with the collected raw water to create a diluted liquid brine mixture;

taking the diluted liquid brine mixture from the tank and blending it in a predetermined ratio with additional raw water from a residential land irrigation system to achieve a further diluted liquid brine mixture having less than the predetermined amount of total dissolved solids; and using the further diluted liquid brine mixture to water the residential land.

4. The method of claim 3, wherein the brine comprises water and potassium chloride.

5. The method of claim 3, wherein the step of blending comprises mixing the diluted liquid brine mixture with additional raw water for a residential lawn sprinkler system.

* * * * *